United States Patent [19]

Fukuda

[11] Patent Number: 4,577,707

[45] Date of Patent: * Mar. 25, 1986

[54] METHOD OF AND APPARATUS FOR COMBINATORIAL COMPUTATION

[75] Inventor: Masao Fukuda, Shiga, Japan

[73] Assignee: Kabushiki Kaisha Ishida Koki Seisakusho, Kyoto, Japan

[*] Notice: The portion of the term of this patent subsequent to Apr. 16, 2002 has been disclaimed.

[21] Appl. No.: 445,013

[22] Filed: Nov. 29, 1982

[30] Foreign Application Priority Data

Nov. 30, 1981 [JP] Japan .................................. 56-193343

[51] Int. Cl.[4] ...................... G01G 19/22; G01G 19/52
[52] U.S. Cl. .......................................... 177/25; 177/1; 177/50
[58] Field of Search ............................... 177/25, 1, 50

[56] References Cited

U.S. PATENT DOCUMENTS

| | | | |
|---|---|---|---|
| 3,939,928 | 2/1976 | Murakami et al. | |
| 4,267,894 | 5/1981 | Hirano et al. | 177/25 |
| 4,328,874 | 5/1982 | Gumberich et al. | 177/25 |
| 4,336,852 | 6/1982 | Hirano | 177/25 |
| 4,336,853 | 6/1982 | Hirano | 177/25 |
| 4,341,274 | 8/1982 | Hirano et al. | 177/25 |
| 4,396,078 | 8/1983 | Minamida et al. | 177/25 X |
| 4,511,010 | 4/1985 | Sashiki et al. | 177/25 |

FOREIGN PATENT DOCUMENTS

| | | |
|---|---|---|
| 3048509 | 9/1981 | Fed. Rep. of Germany . |
| 3124466 | 1/1983 | Fed. Rep. of Germany . |
| 2473705 | 1/1981 | France . |

Primary Examiner—George H. Miller, Jr.
Attorney, Agent, or Firm—Staas & Halsey

[57] ABSTRACT

Batches of articles are charged randomly into a plurality of weighing heads, respectively, and weighing data items which are generated respectively by the weighing heads, are added in combinations. The weighing data items from those weighing heads fewer than all of the weighing heads, preferably substantially half of the weighing heads, are picked up and repeatedly added together to provide a wide variety of combinations of added weighing data items. One of such combinations which gives the added data items equal or closest to a set value is selected to open the weighing heads for discharging a desired combination of batches of articles.

3 Claims, 7 Drawing Figures

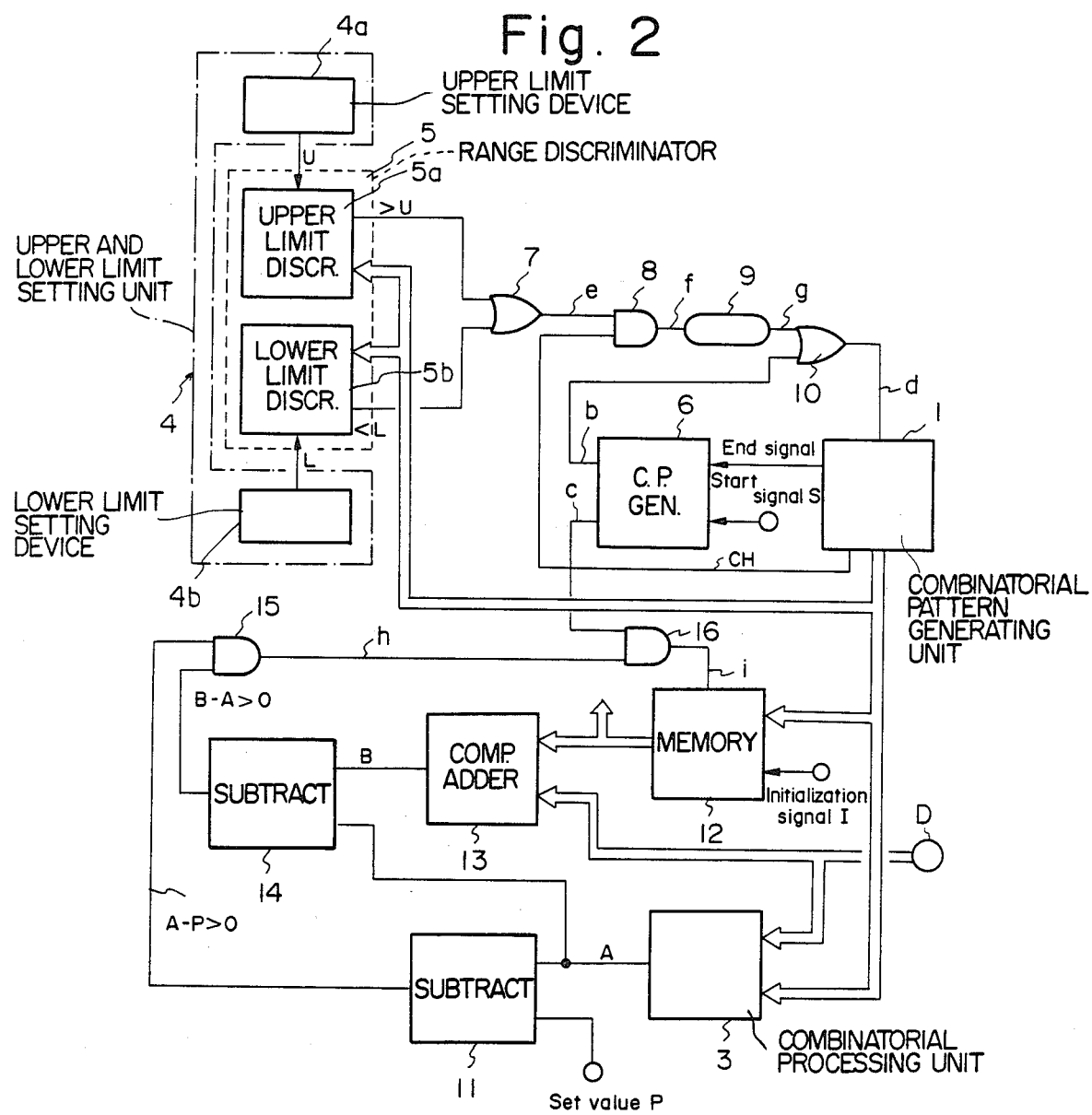

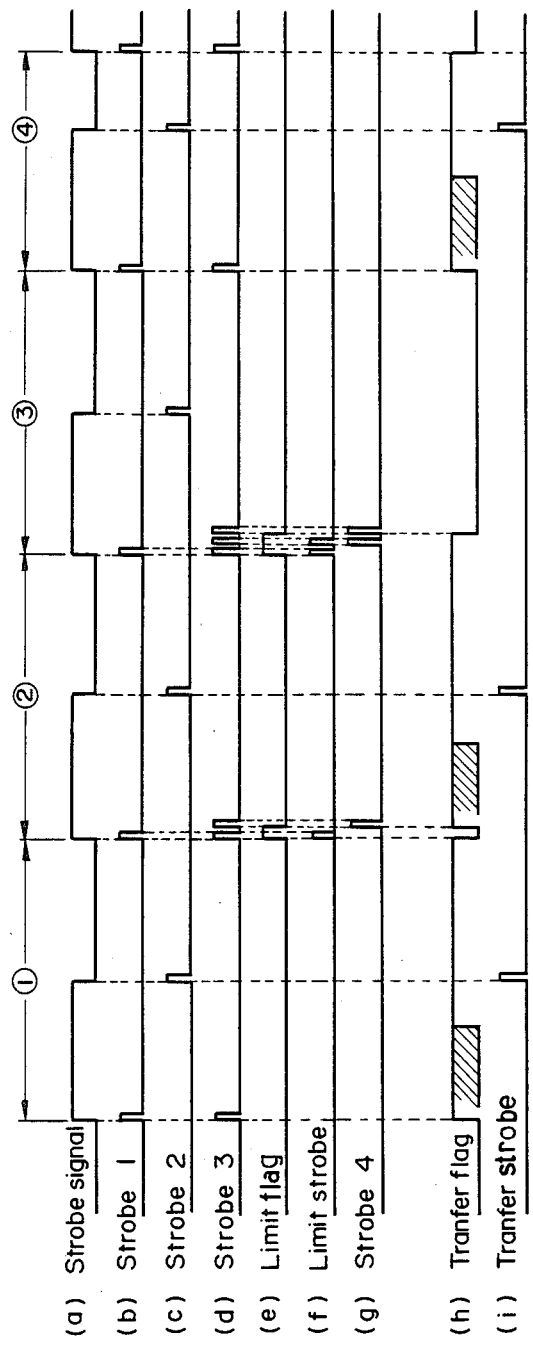

Fig. 4

| Pattern No. \ Bit No. | $X_1$ | $X_2$ | $X_3$ | $X_4$ | $X_5$ | $X_6$ | $X_7$ | $X_8$ | $X_9$ | $X_{10}$ | $X_{11}$ | $X_{12}$ |
|---|---|---|---|---|---|---|---|---|---|---|---|---|
| 1 | ○ | | | | | | | | | | | |
| 2 | | ○ | | | | | | | | | | |
| 3 | ○ | ○ | | | | | | | | | | |
| 4 | | | ○ | | | | | | | | | |
| 5 | ○ | | ○ | | | | | | | | | |
| 6 | | ○ | ○ | | | | | | | | | |
| 7 | ○ | ○ | ○ | | | | | | | | | |
| 8 | | | | ○ | | | | | | | | |
| 9 | ○ | | | ○ | | | | | | | | |
| 10 | | ○ | | ○ | | | | | | | | |
| 11 | ○ | ○ | | ○ | | | | | | | | |
| 12 | | | ○ | ○ | | | | | | | | |
| 13 | ○ | | ○ | ○ | | | | | | | | |
| 14 | | ○ | ○ | ○ | | | | | | | | |
| 15 | ○ | ○ | ○ | ○ | | | | | | | | |
| 16 | | | | | ○ | | | | | | | |
| 17 | ○ | | | | ○ | | | | | | | |
| 18 | | ○ | | | ○ | | | | | | | |
| 19 | ○ | ○ | | | ○ | | | | | | | |
| 20 | | | ○ | | ○ | | | | | | | |
| ⋮ | | | | | | | | | | | | |
| 2045 | ○ | | ○ | ○ | ○ | ○ | ○ | ○ | ○ | ○ | ○ | |
| 2046 | | ○ | ○ | ○ | ○ | ○ | ○ | ○ | ○ | ○ | ○ | |
| 2047 | ○ | ○ | ○ | ○ | ○ | ○ | ○ | ○ | ○ | ○ | ○ | |
| 2048 | | | | | | | | | | | | ○ |
| 2049 | ○ | | | | | | | | | | | ○ |
| 2050 | | ○ | | | | | | | | | | ○ |
| 2051 | ○ | ○ | | | | | | | | | | ○ |
| ⋮ | | | | | | | | | | | | |
| 4091 | ○ | ○ | | ○ | ○ | ○ | ○ | ○ | ○ | ○ | ○ | ○ |
| 4092 | | | ○ | ○ | ○ | ○ | ○ | ○ | ○ | ○ | ○ | ○ |
| 4093 | ○ | | ○ | ○ | ○ | ○ | ○ | ○ | ○ | ○ | ○ | ○ |
| 4094 | | ○ | ○ | ○ | ○ | ○ | ○ | ○ | ○ | ○ | ○ | ○ |
| 4095 | ○ | ○ | ○ | ○ | ○ | ○ | ○ | ○ | ○ | ○ | ○ | ○ |

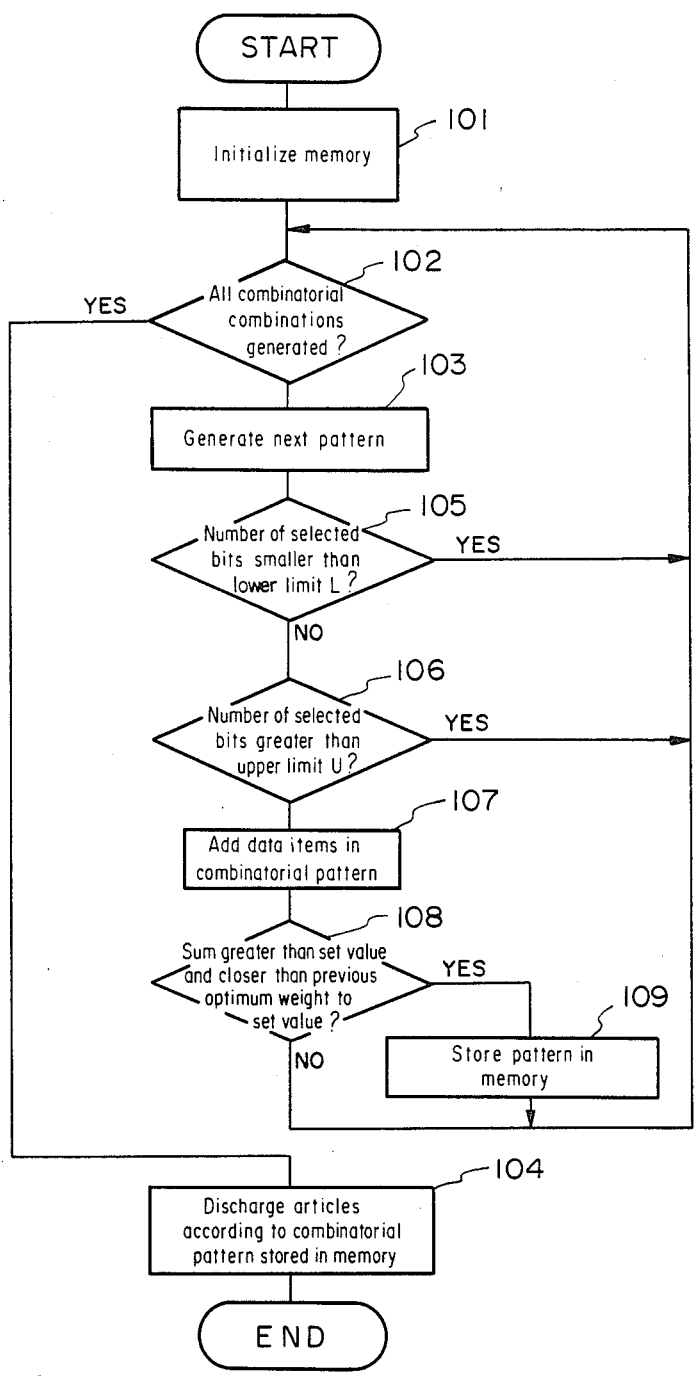

METHOD OF AND APPARATUS FOR COMBINATORIAL COMPUTATION

BACKGROUND OF THE INVENTION

The present invention relates to a method of and apparatus for combinatorial computation in a combinatorial weighing system having a plurality of weighing heads for producing weighing data items which are combined to give a desired total weight, the number of the weighing data items which are added together in combinations being limited to thereby reduce the time required for the combinatorial computation.

There have heretofore been used combinatorial weighing or counting apparatus of the type in which a multiplicity of articles are divided and weighed by a plurality of weighing heads that produce a plurality of weighing data items, which are added in combinations, and one of such combinations is selected which gives an added combinatorial value equal or closest to a weight setting. The combinatorial weighing or counting apparatus serve the purpose of exactly sorting out articles having a set total weight or a set number of articles. The apparatus can dispense articles having a total weight precisely or approximately equal to a weight setting, or a desired number of articles having a total weight precisely or approximately equal a weight setting by way of combinatorial addition of unit weights of articles to be weighed, even when the unit weights differ from one another.

Where ten weighing heads, for example, are employed for such combinatorial addition, the number of patterns of combinatorial addition reaches $(2^{10}-1) = 1023$. The use of twelve weighing heads requires that a total of 4095 $(2^{12}-1)$ patterns of combinatorial addition be worked out. Since all of such combinatorial patterns of adding operation have been carried out according to the prior combinatorial weighing or counting practice, the number of combinatorial arithmetic operations needed is quite large, and it takes a prolonged period of time before the combinatorial operations are completed. An attempt to perform the required operations within a shorter period of time would be to use a more sophisticated arithmetic processing device, which, however, is expensive.

SUMMARY OF THE INVENTION

Accordingly, it is an object of the present invention to provide a method of and an apparatus for effecting combinatorial computation within a short period of time in a combinatorial weighing system for obtaining a desired weight by combining weighing data items generated by a plurality of weighing heads.

Another object of the present invention is to provide a method of and an apparatus for effecting combinatorial computation within a short period of time by limiting weighing data items utilized for the combinatorial computation to a certain number in a combinatorial weighing system for obtaining a desired weight by combining such weighing data items generated by a plurality of weighing heads.

Still another object of the present invention is to provide a method of and an apparatus for effecting combinatorial computation within a short period of time by limiting the number of weighing data items utilized for the combinatorial computation in a range between certain upper and lower limits in a combinatorial weighing system for obtaining a desired weight by combining such weighing data items generated by a plurality of weighing heads.

According to the present invention, there is provided a method of and an apparatus for combinatorial computation in which weighing data items produced respectively from a plurality of weighing heads charged with batches of articles randomly are added in combinations to find one out of such combinations which gives added data items equal or closest to a set value. In combining weighing data items produced by all the weighing heads, about half of a total number of combinatorial patterns are generated by combinations of weighing data items coming from substantially half of the weighing heads. For example, where the number of weighing heads is 10, the number of combinations of weighing data items produced by 5 weighing heads is the greatest reaching substantially half of all the combinations. The number of combinations of weighing data items produced by 4 weighing heads is smaller, and the number of combinations of weighing data items produced by 3 weighing heads is much smaller. Thus, the number of such data item combinations becomes progressively smaller as the number of weighing heads available to produce weighing data items is reduced. It is highly probable therefore that a combination which gives a weight equal or closest to the set value will be obtained from combinations of weighing data items generated from substantially half of all of the weighing heads or from any number of weighing heads which is in the vicinity of substantially half of all of the weighing heads. It is expected that it will be of no use if a number of combinations of weighing data items which is far from the probable numbers of combinations is computed. According to the present invention, any combinatorial operations which could not in all probability give a weight equal or closest to the set value are skipped.

More specifically, a method of combinatorial computation according to the present invention comprises the steps of: charging batches of articles randomly into a plurality of weighing heads; weighing the batches of articles in the weighing heads to produce weighing data items respectively for the batches; adding in combinations those weighing data items which are smaller in number than the number of all the weighing heads; and comparing added data items in one combination with those added data items in the previous combination to determine whether the added data items in the one combination are closer than the added data items in the previous combination to a set value, and leaving the combination which gives the added data items closer to the set value, whereby the added data items equal or closest to the set value can be determined out of the added data items in all the combinations.

An apparatus for combinatorial computation according to the present invention comprises: a plurality of weighing heads for being charged with batches of articles to be weighed; a combinatorial pattern generating unit for successively generating combinatorial patterns of adding together weighing data items produced respectively by the weighing heads; a combinatorial processing unit for adding the weighing data items according to the combinatorial patterns generated by the combinatorial pattern generating unit; a numerical range setting unit for setting a range for the number of weighing data items to take part in combinatorial adding operation; and a range discriminator for determining whether the number of weighing heads according to a combinatorial pattern produced by the combinatorial pattern generator falls within the range set by the numerical range setting unit, and for skipping combinatorial adding operation and causing the combinatorial pattern generator to produce a next combinatorial pattern when the number of weighing heads falls outside of the range, whereby the weighing data items generated by weighing heads fewer than all of the weighing heads will be added together to find a combination of weighing data items which is equal or closer to a set value.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a block diagram of an apparatus according to an embodiment of the present invention;

FIG. 3 is a timing chart of operations of the apparatus shown in FIG. 2,

FIG. 4 table of combinatorial patterns of addition;

FIG. 7 a flowchart for the steps of computerized combinatorial computation according to the present invention.

DESCRIPTION OF THE PREFERRED EMBODIMENTS

Figure 1:
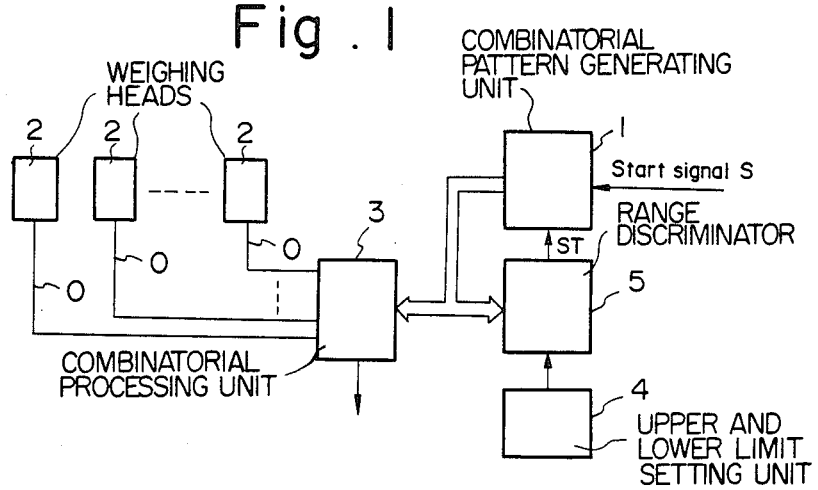
FIG. 1 is a block diagram of a fundamental arrangement for effecting combinatorial computation according to the present invention.

As shown in FIG. 1, a fundamental arrangement according to the present invention comprises a combinatorial pattern generating unit 1 for sequentially generating patterns of combinatorial adding operation, a combinatorial processing unit 3 for adding, in combinations, weighing data items D, D, . . . produced respectively by a plurality of weighing heads 2, 2, . . . , an upper and lower limit setting unit 4 for determining upper and lower limits for the number of weighing data items which are to be used in the combinatorial addition, and a range discriminator 5 for determining whether the number of combined weighing heads 2 which correspond to a combinatorial pattern given by the combinatorial pattern generating unit 1 falls within the range between the upper and lower limits set by the upper and lower limit setting unit 4. When the number of combined weighing heads 2 falls within the set range, the combinatorial pattern is sent to the combinatorial processing unit 3 for enabling the latter to perform an ordinary operation for combinatorial addition. Conversely, when the number of combined weighing heads 2 does not fall within the set range, a combinatorial arithmetic operation based on the combinatorial pattern for that number is skipped, and the combinatorial pattern generating unit 1 then produces a next combinatorial pattern.

It is now assumed in FIG. 1 that there are twelve weighing heads 2, and the number of weighing data items to be used in a combinatorial adding operation ranges from 4 to 9 and is set in the upper and lower limit setting unit 4. In operation, a start signal S is supplied to the combinatorial pattern generating unit 1, which then successively produces 12-bit combinatorial patterns No. 1 through No. 4095, for instance, as illustrated in FIG. 4. When one combinatorial pattern is produced, the range discriminator 5 compares the number of bits of a logic level "H" (which are indicative of weighing heads 2 that take part in a combinatorial adding operation) in the combinatorial pattern with the numerical value set in the upper and lower limit setting unit 4. If the H-level bit number is outside of the set range, then the range discriminator 5 immediately delivers a strobe signal ST to the combinatorial pattern generating unit 1 for causing the latter to issue a next combinatorial pattern. If the H-level bit number falls within the set range, that is, the range of from 4 to 9, then the range discriminator 5 enables the combinatorial processing unit 3 to add the weighing data items D, D, . . . based on the issued combinatorial pattern. Since any combinatorial pattern is skipped when its bit number does not fall within the set range and a next combinatorial pattern is generated for processing immediately thereafter, the total period of time required for combinatorial operations can be several tens % shorter than that which would otherwis,e be needed with the conventional process in which the combinatorial adding operation the effected for all of the combinatorial patterns generated.

The present invention will now be described with respect to more specific embodiments thereof.

FIG. 2 is a block diagram of a combinatorial computation circuit according to a first embodiment of the present invention, the circuit being composed of discrete circuit components. The circuit comprises a combinatorial pattern generating unit 1 for successively generating combinatorial pattern for the adding operation, a combinatorial processing unit 3 for adding, in combinations, weighing data items D issued from weighing heads according to the combinatorial patterns, and an upper and lower limit setting unit 4 for establishing upper and lower limits for the number of weighing data items to be employed in combinatorial adding operations. The upper and lower limit setting unit 4 includes an upper limit setting device 4a and a lower limit setting device 4b. The circuit also has a range discriminator 5 for determining whether the number of combined weighing heads according to a particular combinatorial pattern generated by the combinatorial pattern generating unit 1, falls within the range between the upper and lower limits set by the upper and lower limit setting unit 4. The range discriminator 5 is composed of an upper limit discriminating unit 5a and a lower limit discriminating unit 5b. A clock pulse generator 6 starts to generate a clock signal (a) in response to a start signal S, and also produces first and second strobes 1(b), 2(c) that are short pulses generated at positive-going and negative-going edges, respectively, of the clock signal (a). Outputs from the upper and lower limit discriminating units 5a, 5b are supplied to a first OR gate 7, which produces as an output a limit flag (e) of "H" level when the combinatorial pattern falls outside of the set range. A first AND gate 8 serves to take the AND of the limit flag (e) and a check signal CH of a short width generated from the combinatorial pattern generating unit 1 right after it has produced a new combinatorial pattern, and generates a limit strobe (f) as an output. A delay circuit 9 delays the limit strobe (f) to obtain a strobe 4(g). The strobes 4(g), 1(b) are ORed by a second OR gate 10, which issues a strobe 3(d) to the combinatorial pattern generating unit 1. A first subtracter 11 substracts a set value P from added data A generated by the combinatorial processing unit 3, and produces a signal of "H" level when the difference (A−P) is positive. A memory 12 serves to store one of the computed combinatorial patterns which has a number of combined data items that falls within the set range and is closest to the set value P. A comparative adder 13 adds weighing data items D according to the combinatorial pattern stored in the memory 12, and produces added data B from which the added data A coming from the combinatorial processing unit 3 is subtracted by a second subtracter 14. When the difference (B−A) is positive, the second subtracter 14 issues a signal of "H" level. A second AND gate 15 takes the AND of the output from the first subtracter 11 and the output from the second subtracter 14, and generates a transfer flag (h). The strobe 2(c) from the clock pulse generator 6 and the transfer flag (h) are ANDed by a third AND gate 16, which issues a transfer strobe (i) to the memory 12.

Operation of the apparatus shown in FIG. 2 will be described with reference to the timing chart of FIG. 3.

The upper limit U (9, for example) and the lower limit L (4, for example) for the number of weighing data items used in combinatorial operation are set respectively in the upper limit setting device 4a and the lower limit setting device 4b. After articles have been weighed by the weighing heads 2, 2, . . . , the combinatorial operation is started. First, an initializing signal I is supplied to the memory 12 to clear its stored content, and the start signal S is supplied to the clock pulse generator 6, which then starts to generate the clock signal (a) as illustrated in FIG. 3. At the first positive-going edge of the clock signal (a), the first strobe 1(b) is generated which is delivered through the second OR gate 10 as the strobe 3(d) to the combinatorial pattern generating unit 1. The combinatorial pattern generating unit 1 now produce the first combinatorial pattern (the pattern No. 1, for instance, in FIG. 4). The range discriminator 5 determines whether the produced combinatorial pattern falls within the set range between the upper and lower limits. When the number of selected weighing heads, that is, the number of "H" level bits, exceeds the upper limit U, the upper limit discriminatin 5a generates a decision signal of "H" level (H>U). Conversely, when the number is lower than the lower limit L, the lower limit discriminating unit 5b generates a decision signal of "H" level (H<L). The limit flag (e) produced by the first OR gate 7 becomes the "L" level only when the number of selected weighing heads in the combinatorial pattern falls within the set range. While the limit flag (e) is produced from the first OR gate 7, the combinatorial pattern generating unit 1 supplies the check signal CH to one of the input terminals of the first AND gate 8. The output from the first OR gate 7 is then supplied as the limit strobe (f) to the delay circuit 9, which delays the supplied pulse and applies the delayed pulse as the strobe 4(g) to the second OR gate 10. The second OR gate 10 supplies the delayed pulse as the strobe 3(d) to the combinatorial pattern generating unit 1. When supplied with the "H" level strobe 3(d), the combinatorial pattern generating unit 1 immediately generates a next combinatorial pattern. The range discriminator 5 again determines whether the next combinatorial pattern falls within the set range, and the foregoing cycle of operation is repeated to produce renewed combinatorial patterns until a combinatorial pattern is generated which falls within the set, range. The pattern renewal cycle of operation is much shorter than the period of the clock pulses (a). Even when the pattern renewal operation is delayed, it will be finished within an interval of time indicated by a hatched area at (h) in FIG. 3, and the apparatus will then enter a combinatorial operation for data comparison.

In FIG. 3, cycles 1 and 4 indicate the first and fourth combinatorial patterns which fall within the set range. In a cycle 2, the second combinatorial pattern falls within the set range, and in a cycle 3, the third combinatorial pattern falls within the set range. When a combinatorial pattern is generated which falls within the set range, the combinatorial processing unit 3 adds the weighing data items D supplied from the weighing heads 2, 2, . . . according to the combinatorial pattern. The added data A which is the result of the adding operation is compared with the set value P in the first subtracter 11. When A−P >0, a "H" level signal is issued by the first subtracter 11 to the second AND gate 15. The comparative adder 13 adds the weighing data items D according to the combinatorial pattern stored in the memory 12, and produces added data B. The second subtracter 14 subtracts the added data A from the added data B. When the added data A, which is based on the newly generated combinatorial pattern, is smaller than the data B (B−A >0), the second subtracter 14 generates a "H" level signal. The second AND gate 15 produces the transfer flag (h) of "H" level when both of the outputs from the first and second subtracters 11, 14 are of "H" level, that is, when the added data A according to the newly produced combinatorial pattern is greater than the set value P and smaller than the added data B according to the stored combinatorial pattern. When the strobe 2(c) is generated at a negative-going edge of the clock pulses (a) while the transfer flag (h) is being produced, the transfer strobe (i) is generated in synchronism with the strobe 2(c). The transfer strobe (i) enables the memory 12 to store a renewed combinatorial pattern generated by the combinatorial pattern generating unit 1. When the first combinatorial pattern is generated, there has been no combinatorial pattern stored in the memory 12, and hence the first combinatorial pattern is stored unconditionally in the memory 12. Such renewed pattern storage is not effected in each cycle, but carried out only when a transfer flag (h) is set up as a result of a combinatorial operation. In the cycle 3, therefore, the stored combinatorial pattern is not renewed as there is no transfer flag produced in that cycle. Added data items are successively compared which correspond to combinatorial patterns that are sequentially produced by the clock pulses (a). When the final combinatorial pattern has been generated and the combinatorial pattern generating unit 1 issues an end signal to the clock pulse generator 6, only one combinatorial pattern which is equal or closest to the set value P remains stored in the memory 12. Accordingly, the combinatorial operations for all of the combinations are performed while skipping those combinations that are excluded from the set range, resulting in a desired combinatorial pattern left stored in the memory 12. The weighing heads 2 that correspond to the bits of "H" level according to the combinatorial pattern stored in the memory 12 are then opened to discharge articles which, as a whole, have a desired total weight.

With the circuit arrangement of FIG. 2, combinatorial data which is closer to the set value P, can be obtained by storing successive combinatorial patterns in the memory 12, and computing added data B in the comparative adder 13 based on the previous combinatorial patterns for comparison subsequent to the respective combinatorial operations. However, the present invention is capable of other processes of combinatorial operation. As an example, the difference between added data and a set value P may be stored in the memory, and added data items may be compared with the stored difference. Such an arrangement is shown as a second embodiment in FIG. 5.

Figure 5:
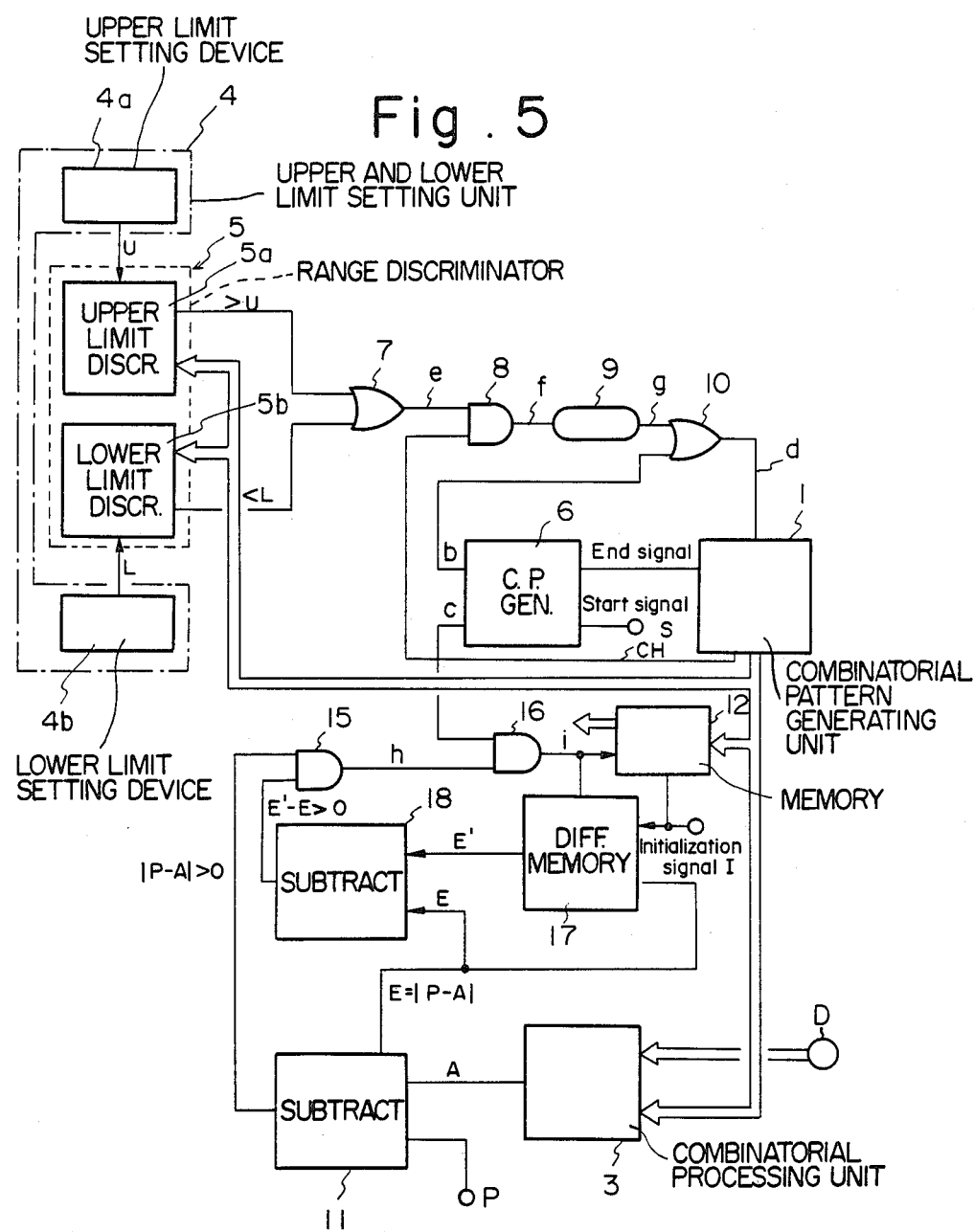
FIG. 5 a block diagram of an apparatus according to another embodiment of the present invention.

Identical parts in FIG. 5 are denoted by identical reference characters in FIG. 2. The circuit shown in FIG. 5 includes a memory 17 for storing the difference between added data and a set value P, and a second subtracter 18 for subtracting added data A from the set value P and comparing an absolute difference (E $= |P-A|$) generated by the first subtracter 11 with a difference E' stored in the difference memory 17. The second subtracter 18 produces a signal of "H" level when the difference E' is larger than the absolute difference E (E'−E >0). Operation of the circuit arrangement of FIG. 5 is substantially the same as that of the circuit shown in FIG. 2 except that data available for comparison is composed of the difference stored in the difference memory 17. When the transfer strobe (i) is generated, the combinatorial pattern stored, in the memory 12 is replaced with a combinatorial which is currently produced, and at the same time the difference (E $= |P-A|$) produced by the first subtracter 11 is transferred to and stored in the difference memory 17. The apparatus shown in FIG. 5 is capable of obtaining a combination of articles having a total weight smaller than the set value P.

As another process of combinatorial operation other than the first and second embodiments as described above, added data according to a previous combinatorial pattern which is closest to a set value P may be stored, and the set value P may be subtracted from the stored data, with the difference being supplied to the subtracter for data comparison.

Figure 6:
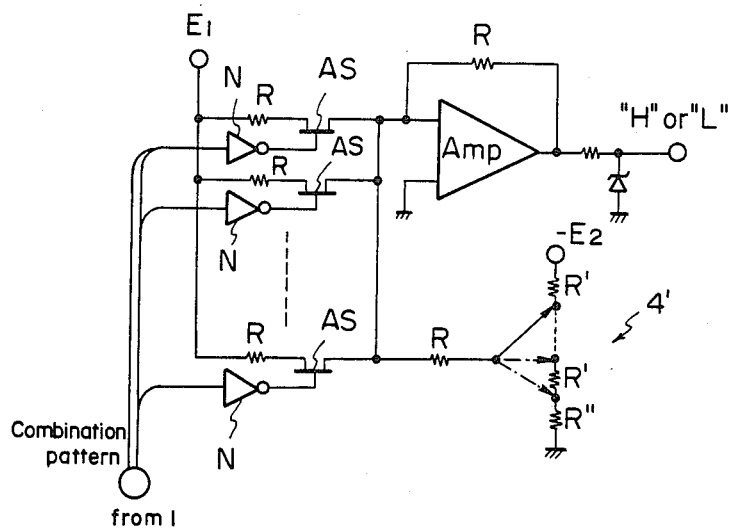
FIG. 6 is a circuit diagram of a range discriminator.

Various methods can be put to use for determining whether a combinatorial pattern falls within a set range between upper and lower limits in the range discriminator 5. For example, a combinatorial pattern may be supplied as a parallel input to a shift register in which the data is shifted by the number of all bits contained in the combinatorial pattern, the number of bits of "H" level appearing at a serial output terminal of the shift register may be counted, and the count may be compared with an upper limit setting U and a lower limit setting L. Another process may incorporate a digital comparator for direct comparison between the bit number and upper and lower limits. FIG. 6 illustrates an analog adder circuit arrangement for effecting analog comparison of such data.

In FIG. 6, analog switches AS are supplied respectively with bits of "H" level or "L" level in a combinatorial pattern being supplied through inverters N, and those analog switches AS which are fed with the bits corresponding to the selected weighing heads are energized. The energized analog switches AS allow a voltage $E_1$ to be applied through resistors R to an input of an amplifier Amp. When the number of bits that energize the analog switches AS is n, a current of $E_1/nR$ flows and is supplied to the amplifier Amp. The current of $E_1/nR$ is compared by the amplifier Amp with a current $-E_2/mR$ (m is a resistance-divided ratio for determining upper and lower limits U, V) which is divided by resistors R', R", ... in a setting unit 4'. The result indicative of whether the current is larger or smaller than the set value is supplied as an output signal of "H" or "L" level from the amplifier Amp. There are provided two circuits as shown in FIG. 6 which serve as upper and lower limit discriminating units, respectively. Alternatively, the lower limit discriminating unit may be dispensed with, and only the upper limit discriminating unit may be employed.

While in the foregoing embodiments circuit arrangements are shown and described which incorporate discrete or analog circuit components, it is preferable that the present invention be reduced to practice through computerization. FIG. 7 is a flow chart of successive steps of operation under the control of a computer program. In FIG. 7, at a step 101, a memory is initialized by an initializing signal to clear its content. The initializing signal is also supplied to a difference memory to clear its content. A step 102 determines whether all combinatorial patterns have been generated. If the answer is "YES", then the program goes to a step 104 in which the covers of weighing heads corresponding to bits of "H" level in the combinatorial pattern stored in the memory are opened to discharge articles, and all weighing operation is brought to an end. If the answer to the inquiry at step 102 is "NO", then the program proceeds to a step 103 in which a next combinatorial pattern is produced. A step 105 determines whether the number of selected bits in the combinatorial pattern is smaller than a lower limit L. If the answer is "YES", then no combinatorial computation is effected, and the program goes back to the step 102. If the answer is "NO", then the program goes on to a step 106 to see if the number of selected bits is greater than an upper limit U. If the answer is "YES", then no combinatorial computation is carried out, and the program goes back to the step 102. If the answer is "NO", then the number of selected bits in the combinatorial pattern are is between the the lower and upper limits L, U and there is a high probability that the added data will be equal or closest to the set value. The program proceeds to a step 107 in which data items in the combinatorial together. At a step 108, the weight as thus computed is compared with the set value, and also with a previous optimum weight which is given by combined weighing data items selected in accordance with an optimum combinatorial pattern picked so far. If the computed weight is larger than the set value and closer than the previous optimum weight to the set value that is, the answer to the inquiry at step 108 is "YES", then the program goes on to a step 109 in which the combinatorial pattern giving that weight is stored in the memory. The program returns to the step 102 to repeat the foregoing cycle of operation. If the answer at the step 108 is "NO", then the program immediately goes back to the step 102 to perform the repeated cycle of operation.

With the present invention, a range for the number of preferred weighing data items to be employed for combinatorial operation is defined in advance in a combinatorial weighing or counting machine, and combinatorial computation for combinatorial patterns that do not fall within the defined range, is omitted. Therefore, the rate of combinatorial computation can be increased without reducing the precision with which combinatorial counting or weighing operation is performed.

Although certain preferred embodiments have been shown and described in detail, it should be understood that many changes and modifications may be made therein without departing from the scope of the appended claims. For example, the present invention is applicable not only to the combinatorial weighing apparatus, but also to the combinatorial counting apparatus, wherein the number of articles stored in each weighing hopper is computed by dividing the weight value by the mean weight value of one article and obtaining optimum an combination of the weighing hoppers whose total number of articles are equal to the target number or closest thereto.

What I claim is:

1. An apparatus for combinatorial computation comprising:
   a plurality of weighing heads charged with batches of articles to be weighed, for respectively weighing the batches of articles and for generating respective weighing data items;
   a combinatorial pattern generating unit for successively generating combinatorial patterns corresponding to combinations of the weighing data items;
   a combinatorial processing unit, coupled to said weighing heads and said combinatorial pattern generating unit, for adding the weighing data items according to the combinatorial patterns generated by said combinatorial pattern generating unit;
   a numerical range setting unit for setting a range with upper and lower limits for the number of weighing data items required to take part in the adding operation of said combinatorial processing unit; and
   a range discriminator, coupled to said combinatorial pattern generating unit, said combinatorial processing unit, and said numerical range setting unit, for determining whether the number of weighing heads, corresponding to a combination of the weighing data items according to a combinatorial pattern produced by said combinatorial pattern generator, falls within the range set by said numerical range setting unit, and for skipping the adding operation and causing said combinatorial pattern generator to produce a next combinatorial pattern when said number of weighing heads falls outside of said range, the lower limit of the range set by said numerical range setting unit being greater than zero and less than substantially half the number of weighing heads, the upper limit being less than the total number of weighing heads and greater than substantially half the number of weighing heads, whereby combinations of weighing data items corresponding to a number of weighing heads which is less than all of said weighing heads, will be added together to find a combination of weighing data items which is equal or closest to a set value.

2. An apparatus according to claim 1, wherein each of said weighing data items corresponds to the number of articles in the corresponding one of said weighing heads.

3. A combinatorial measuring method comprising the steps of:
   (a) measuring batches of articles respectively stored in a plurality of weighing heads to obtain respective measured values;
   (b) generating combinatorial patterns for combinations of the plurality of weighing heads;
   (c) determining, for each of the combinatorial patterns generated in said step (b), whether the combinatorial pattern corresponds to a number of weighing heads which is between an upper limit and a lower limit, the lower limit being greater than zero and less than substantially half the number of weighing heads, the upper limit being less than the total number of weighing heads and greater than substantially half the number of weighing heads;
   (d) adding the measured values corresponding to the combinatorial pattern for each of the combinatorial patterns determined in said step (c) to correspond to a number of weighing heads which is between the upper and lower limits, to obtain a plurality of added measured values; and
   (e) selecting, from all of the added measured values, an optimum combination having an added measured value which is equal to or closest to a set value within preset limits.

* * * * *

UNITED STATES PATENT AND TRADEMARK OFFICE
CERTIFICATE OF CORRECTION

PATENT NO. : 4,577,707
DATED : MARCH 25, 1986
INVENTOR(S) : MASAO FUKUDA

It is certified that error appears in the above-identified patent and that said Letters Patent is hereby corrected as shown below:

```
Col. 1, line 27, after "equal" insert --to--.

Col. 4, line 23, "otherwis,e" should be --otherwise--;
        line 25, "the" should be --is--;
        line 34, "pattern" should be --patterns--.

Col. 5, line 1,  "substracts" should be -- subtracts --.
        line 38, "produce" should be --produces--;
        line 44, "discriminatin" should be
                 --discriminating unit--;
        line 68, delete ",".

Col. 8, line 38, delete "are";
        line 38, "the the" should be --the--;
        line 42, after "combinatorial" insert --pattern
                 are added--;
        line 49, "that" should be --(that--;
        line 50, before "," insert --)--.

Col. 9, line 7, after "obtaining" insert --an--;
        line 8, delete "an".
```

Signed and Sealed this

Eighth Day of July 1986

[SEAL]

Attest:

DONALD J. QUIGG

Attesting Officer

Commissioner of Patents and Trademarks